G. P. PIERCE.
MACHINE FOR USE IN THE MANUFACTURE OF PULLEY STILES OF WINDOW SASH FRAMES.
APPLICATION FILED JAN. 16, 1912.
1,114,512.
Patented Oct. 20, 1914.
2 SHEETS—SHEET 2.
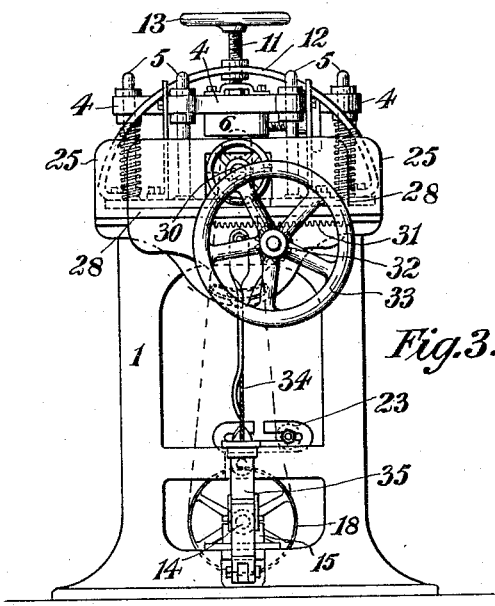
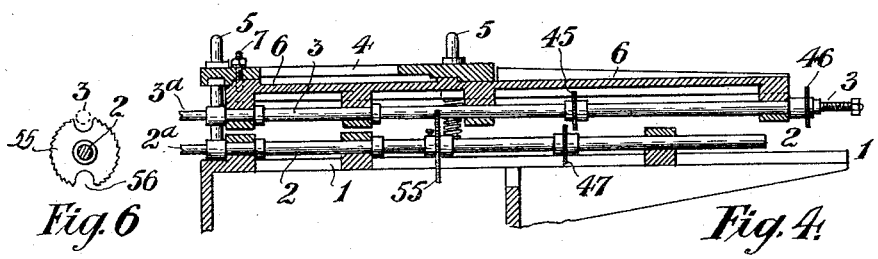
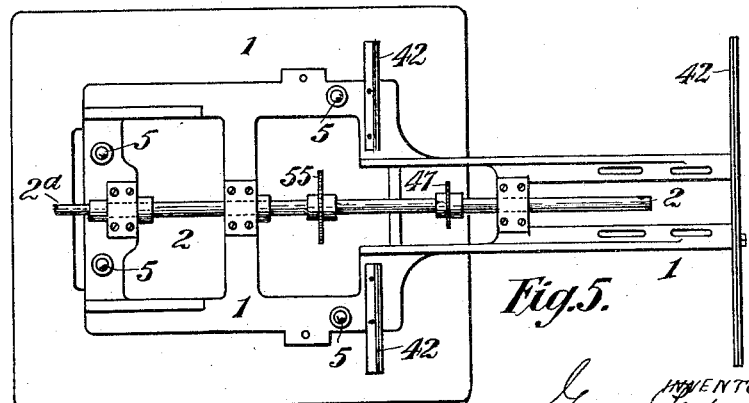

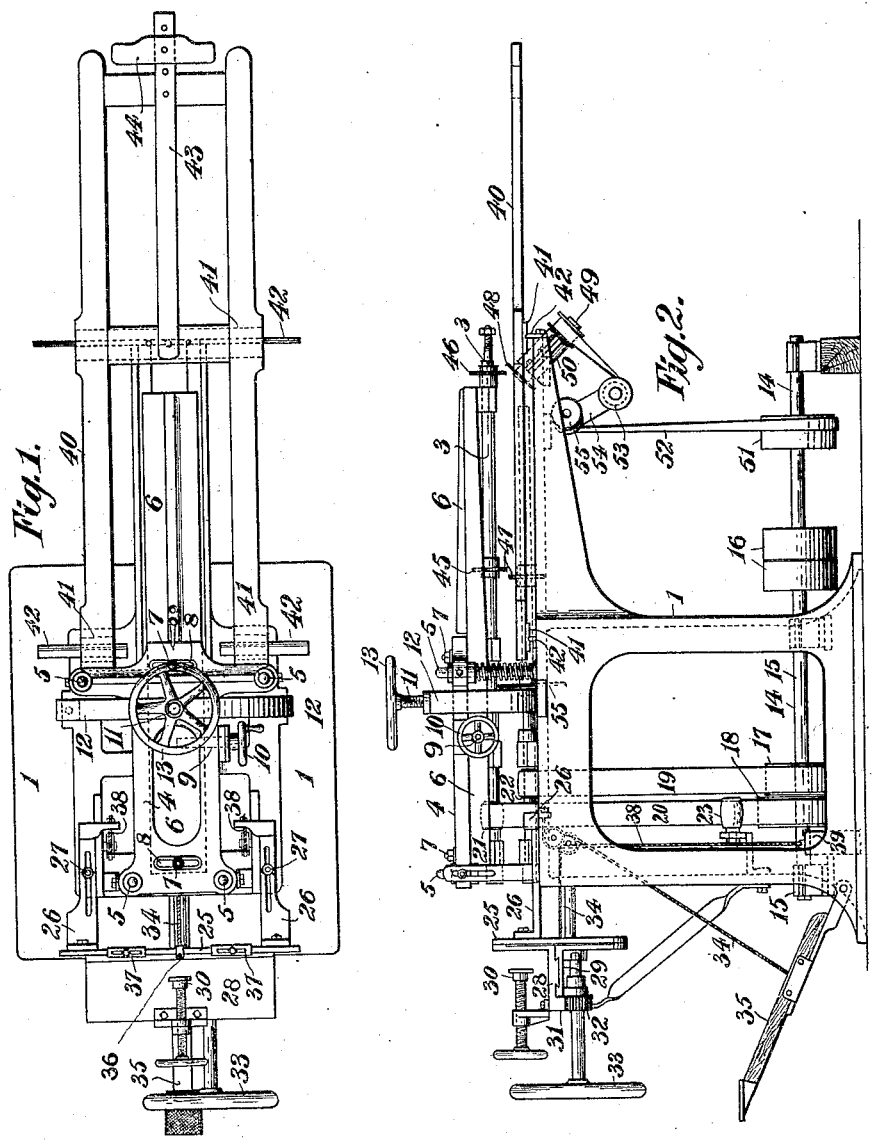

UNITED STATES PATENT OFFICE.

GEORGE PORTER PIERCE, OF MELBOURNE, VICTORIA, AUSTRALIA.

MACHINE FOR USE IN THE MANUFACTURE OF PULLEY-STILES OF WINDOW-SASH FRAMES.

1,114,512.   Specification of Letters Patent.   Patented Oct. 20, 1914.

Application filed January 16, 1912. Serial No. 671,518.

*To all whom it may concern:*

Be it known that I, GEORGE PORTER PIERCE, a subject of the King of Great Britain and Ireland, residing at Melbourne, in the State of Victoria, Commonwealth of Australia, have invented an Improved Machine for Use in the Manufacture of Pulley-Stiles of Window-Sash Frames, of which the following is a specification.

This invention relates to an improved machine for use in the manufacture of pulley stiles of window sash frames and refers more particularly to a machine for cutting mortises for the pulleys and recesses for the flanges of the same, and also for cutting the pocket piece for inserting the sash weights. To accomplish this object I construct a machine comprising a stand supporting two horizontal shafts arranged one above the other each carrying a mortising drill or the like, adapted to cut the recesses for the flanges of the pulley to the required depth and also cut the mortises or slots through the stile for the pulleys themselves—with means for adjusting the relative position of the two shafts carrying the drills according to the size of the stile to be operated upon. Means are also provided for supporting and holding the stile piece on edge and imparting a horizontal and lateral movement thereto so that it may be moved into position against the rotating drills which first cuts the mortises or slots for the pulleys and then the recesses for the flanges of the same. The rotating shafts carrying the mortising drills or like tools are also furnished with the necessary circular saws which in combination with a circular saw set at an incline and supported on the end of the aforesaid stand make the necessary cuts in the stile to enable the pocket pieces for the sash weights to be readily broken out, in such a manner that they may be readily replaced. These circular saws are capable of adjustment according to the size of the stile.

The machine is so constructed that it can be set for cutting the mortises and recesses in the stile piece for the pulleys, and the flanges of the same, and then again set to receive the stile piece at the opposite end of the machine in order that the necessary saw cuts can be formed therein for the pocket pieces.

It will be understood that the operation of forming the mortises and recesses in the stile piece is carried out independently of the operation of forming the saw cuts for the pocket pieces, as the stile piece has to be fed or placed at different positions in the machine for each operation.

The invention will now be more fully described aided by a reference to the accompanying sheets of drawings in which:—

Figure 1 is a plan, Fig. 2 a side elevation, Fig. 3 an end elevation of a machine embodying this invention. Fig. 4 is a central longitudinal section of the upper portion of the machine showing the relative position of the shafts when used for cutting the recesses and mortises for the pulleys. Fig. 5 is a plan of the stand with the adjustable top portion removed. Fig. 6 is a detail view of the cross cut saw showing the gaps formed therein to enable the rotating shafts to be brought to their relative position for forming the mortises and recesses for the pulleys and flanges of the same.

A machine constructed according to this invention comprises a suitable stand 1 in which is mounted a pair of parallel rotating shafts 2 and 3 the outer ends of which are adapted to receive mortising bits or tools 2ª and 3ª for forming the mortises for the pulleys and the recesses for the flanges of same as hereinafter described. The lower shaft 2 is mounted in suitable bearings in the stand 1 while the upper shaft 3 is mounted in bearings of a bracket 6 upon the underside of a head piece 4. This head piece 4 is supported upon vertical pillars 5 and capable of vertical adjustment thereon. The bracket 6 is secured to the head piece 4 by the studs or bolts 7 passing through the slots 8 whereby it is capable of lateral adjustment by means of the screw 9 and hand wheel 10. The said head piece 4 and bracket 6 are also capable of vertical adjustment on the pillars 5 by the screw 11 working in a nut upon a stationary cross bar 12 and having an operating hand wheel 13. In this way the relative positions of the rotating shafts 2 and 3 may be adjusted either vertically or laterally according to the size of stile and the condition of the work being done thereon.

At the bottom of the stand or framework 1 is mounted the driving shaft 14 in suitable bearings 15 having fast and loose driving pulleys 16. This driving shaft 14 carries two pulleys 17 and 18 having belts 19 and 20 working upon pulleys 21 and 22 respectively upon the two parallel shafts 2 and 3, the belt 20 having an idle or jockey pulley 23 for the purpose of taking up the slack in the said belt as the position of the shaft 3 is adjusted to suit circumstances.

For the purpose of delivering the stile piece on edge up against the mortising drills or like tools 2ª and 3ª to form the mortises and recesses therein, a fence or carrier 25 is provided at the front of the machine which fence or bracket 25 is supported on guide bars 26 projecting from the stand 1 and working on pins or guides 27 secured thereto. This fence or bracket 25 also supports a sliding plate or table 28 adapted to slide laterally on a dove-tail guide 29 formed on the bracket 25. This sliding table 28 is adapted to hold the stile piece on edge the same being held in place by a clamp 30 and is capable of lateral adjustment on the guide 29 at either side of the center by means of a rack 31, pinion 32 and hand wheel 33. A rope or cord 34 is connected at one end to the fence or bracket 25 and at its other end to a foot lever 35 hinged as shown to the machine frame. By pressing the said foot lever 35 the stile piece is brought into contact with the mortising drills 2ª and 3ª, suitable stops being provided on the stand 1 to engage the end of the guide bars 26 to limit the forward travel of the fence together with the stile piece when forming the recesses for the flanges of the pulleys. A stop 36 is secured to the vertical flanges of the sliding table 28 and adapted to engage adjustable stops 37 secured to the vertical flange of the fence or bracket 25 thus limiting the lateral movement of the stile piece at either side of the center according to the length of the mortises required.

To enable the fence or bracket 25 to be returned to its normal position when the pressure on the foot lever 35 is released, cords 38 are attached to the guide bars 26 and to weights 39.

In practice for forming the recesses and mortises in the stile for the pulleys, the rotating shafts are adjusted to their relative vertical positions by means of the hand wheel 13, according to the width of the stile piece which is clamped in position on the table 28 by the clamp 30 at the front end of the machine. By pressing down the foot lever 35 the stile piece is brought up against the mortising drills 2ª and 3ª, the required number of times to cut the mortises for the pulleys. Then, by moving the fence or bracket 25 laterally together with the stile piece by the rack 31 and pinion 32 at either side of the center, the drills 2ª and 3ª form the recesses of the required depth and length for the flanges of the pulleys. If desired, drills of different sizes may be employed, one for cutting the mortises and the other for forming the recesses.

Upon the stand 1 and preferably at the rear, is provided a sliding carrier 40 for supporting the stile piece flatwise, and carrying the same between certain saws for the purpose of making certain cuts whereby the pocket piece for the sash weight may be easily broken out. This carrier 40 is fitted with guide piece 41 adapted to slide on guide bars 42 secured to the stand 1. A gage 43 having an adjustable cross head 44 is attached to the carrier 40 for the purpose of guiding the stile piece into a proper position with regard to the saws as hereinafter described.

Upon the lower rotating shaft 2 are mounted a series of circular saws working in conjunction with circular saws upon the upper rotating shaft 3, for the purpose of making cuts across the front and the back face of the stile as held in the carrier 40. Upon the upper rotating shaft 3 are mounted two circular saws 45, 46, which are adapted to make cuts across one face of the stile piece, say about half way through. Upon the lower rotating shaft 2 is mounted a circular saw 47 which is set not quite opposite the saw 45. An additional saw 48 is also provided secured to a short shaft 49 working in bearings on a bracket 50. This bracket 50 is mounted adjustably upon the frame or stand 1 and the shaft 49 is set at an incline so that the saw 48 makes an oblique cut in the under face of the stile piece as held in the carrier 40. This saw 48 is driven from a pulley 51 on the driving shaft 14 by a belt 52 which passes about guide pulleys 53 mounted on an adjustable bracket 54 secured to the frame 1. The saws 45, 46, 47 and 48 are all adjustable with regard to each other being preferably so arranged that the saw 47 makes a cut upon the under face of the stile piece, a short distance beyond the cut made by the saw 45, while the saw 48 makes an oblique cut on the under face of the stile, also a short distance beyond the cut made by the saw 46.

For making the proper cuts into the stile-piece, the edges of the saws 45, 46, 47 and 48 have to be placed in the same horizontal line. This is accomplished after the stile-piece has been placed into its proper position on the supporting frame 40. For placing the stile-piece in position, it is necessary to raise the upper shaft sufficiently so as to bring the stile-piece in position by means of the adjusting screw 11 and hand-wheel 13, and then lower the upper shaft with its saws into position for producing the cutting action. When the cutting action is accomplished by the four saws, the end of the stile-piece is cut off by means of an ordinary cross-cut saw 55, which is adjustably mounted on the lower shaft 2. The adjustment is accomplished for the proper length of the stile, upon which the upper shaft 3 is moved sidewise clear of the saw 55 by the hand-wheel 10 and the end of the stile cut off. The stile is then removed from the machine and the longitudinal saw-cuts, which connect the cross-cuts made by the saws 45, 46, 47 and 48, made by hand so that the pocket-piece may be broken out by a blow from a hammer on the same, the wood being split across the grain at the ends of the pocket-piece.

During the action of the cross-cut saw 55 the stile-piece is held on the frame 40 against the gage or head-piece 44. The cross-cut saw 55 is provided with two gaps 56, which are located at diametrically opposite points of the saw, and which permit the upper shaft 3 to be placed in one of the gaps when the mortising action of the two shafts, for forming the recesses and slots in the stile-piece, has to be done. For the action of the mortising bits at the ends of the shafts 2 and 3, the shafts are placed vertically one above and at proper distance from each other by the adjusting mechanism operated by the hand-wheels 10 and 13, while the hub of the saw 55 is released from the shaft 2, so that the latter can turn without taking the saw 55 along and without the same interfering with the proper rotary motion of the upper shaft 3.

I claim:—

1. A machine for use in the manufacture of pulley-stiles of window sash-frames, comprising a stand supporting a pair of rotating shafts, each furnished with mortising bits at one end, saws on said shafts for forming cuts in the stile-piece to enable the pocket-pieces to be broken out for inserting the sash-weights, means for laterally and vertically adjusting the relative position of the upper shaft toward the lower shaft, and a gage-device for holding the stile in proper position for cutting the same.

2. In a machine for use in the manufacture of pulley-stiles of window sash-frames, the combination of a stand, a pair of rotating shafts supported thereon, each shaft being furnished with mortising bits at the ends thereof for forming or cutting the mortises, saws on said shaft for forming cuts in the stile-piece to enable the pocket-pieces to be broken out for inserting the sash-weights in combination with a fence or carrier for holding the stile-piece on edge against the said bits, substantially as described.

3. In a machine for use in the manufacture of pulley-stiles of window sash-frames, the combination of a stand, a pair of rotating shafts supported thereon, each shaft being provided with mortising bits at the ends, saws on said shafts for forming saw-cuts in the stile, a fence or carrier secured to guide-bars working on guide-pins or the like, stops on said fence, a sliding table adjustably supported on the carrier, a clamp for holding the stile-piece on edge against the carrier, means for moving the said table laterally across the said mortising bits, and means for moving the said carrier longitudinally up against the said mortising bits, substantially as described.

4. In a machine for use in the manufacture of pulley-stiles of window sash-frames, the combination of a stand, a pair of rotating shafts supported thereon, each shaft being furnished with mortising bits, and means for forming cuts in the stile-piece to enable pocket-pieces to be broken therefrom comprising two spaced saws mounted upon the upper rotating shaft in conjunction with a saw mounted upon the lower rotating shaft slightly offset from one of the saws on the upper shaft, an additional saw adapted to make an oblique cut set in line with the saw upon the lower shaft, a carrier for holding the stile-piece flatwise while the said saws are adapted to cut into the top and bottom faces of the same, and means for supporting and clamping the work opposite the above-mentioned mortising bits and feeding it toward or transversely of the bits.

5. In a machine for use in the manufacture of pulley-stiles of window sash-frames, the combination of a stand, two rotating shafts supported on said stand and provided with mortising bits at one end, two saws mounted upon the upper rotating shaft, a saw mounted upon the lower rotating shaft, an additional saw adapted to make an oblique cut set in line with the saw upon the lower shaft, a carrier for holding the stile-piece flatwise while the said saws are adapted to cut into the top and bottom faces of the same, and an additional saw upon the lower rotating shaft for squaring off the end of the stile-piece.

6. In a machine for use in the manufacture of pulley-stiles of window sash-frames, the combination of a stand, a pair of rotating shafts supported thereon, each shaft being provided with mortising bits at one end, saws on said shafts for forming cuts in the faces of the stile-piece, means for adjusting the relative vertical position of one shaft toward the other shaft, said means comprising a head-piece, a bracket on said head-piece upon which the upper shaft is mounted, vertical screw-posts for said head-piece, a cross-bar, and means connected with the head-piece for raising or lowering the same.

7. In a machine for use in the manufacture of pulley-stiles of window sash-frames, the combination of a stand, a pair of rotating shafts supported thereon, each furnished with a mortising bit at the end, and means for forming cuts in the stile-piece to enable pocket-pieces to be broken therefrom, comprising two spaced saws mounted upon the upper rotating shaft in conjunction with a saw mounted upon the lower rotating shaft slightly offset from one of the saws on the upper shaft, an additional saw adapted to make an oblique cut set in line with the saw upon the lower shaft, a carrier for holding the stile-piece flatwise while the saws are adapted to cut into the top and bottom faces of the stile, means for vertically adjusting the upper shaft, means for laterally adjusting the same, and means for supporting and clamping the work opposite to the before-mentioned mortising bits and feeding it forward or transversely to the bits.

In testimony that I claim the foregoing as my invention, I have signed my name in the presence of two subscribing witnesses.

GEORGE PORTER PIERCE.

Witnesses:
CLEMENT A. HACH,
JOHN DELBRIDGE.

---

Copies of this patent may be obtained for five cents each, by addressing the "Commissioner of Patents, Washington, D. C."